United States Patent [19]

Durairaj et al.

[11] Patent Number: 5,021,522
[45] Date of Patent: Jun. 4, 1991

[54] RUBBER COMPOUNDING RESIN

[75] Inventors: Bojayan Durairaj; Alex Peterson, Jr., both of Pittsburgh, Pa.; Robert M. Lamars, Willoughby Hills, Ohio; Richard T. Hood, Murrysville, Pa.

[73] Assignee: Indspec Chemical Corporation, Pittsburgh, Pa.

[21] Appl. No.: 482,704

[22] Filed: Feb. 21, 1990

Related U.S. Application Data

[63] Continuation-in-part of Ser. No. 214,325, Jul. 1, 1988.

[51] Int. Cl.$^5$ .............. C08G 14/02; C08F 61/00; D04B 1/00; B32B 25/00
[52] U.S. Cl. .................. 525/502; 528/138; 528/143; 528/144; 528/153; 528/155; 525/68; 525/137; 525/138; 525/139; 428/241; 428/495
[58] Field of Search ............ 528/153, 138, 143, 144, 528/155; 525/137, 139, 138, 68, 502; 428/241, 495

[56] References Cited

U.S. PATENT DOCUMENTS 3,751,331 8/1973 Dane et al. .................... 428/241
4,703,086 10/1987 Yamamoto et al. ............ 525/139

Primary Examiner—John Kight, III
Assistant Examiner—Kathryne E. Shelborne
Attorney, Agent, or Firm—Herbert J. Zeh, Jr.; Michael J. Kline

[57] ABSTRACT

An improved vulcanizable rubber composition of the type comprising (I) a rubber component selected from natural rubber, synthetic rubber or combinations thereof, and (II) a methylene donor compound which generates formaldehyde upon heating, and (III) a phenolic novolak resin type methylene acceptor compound is disclosed. The improvement comprises having at least ten mole percent of the phenolic groups of the phenolic novolak resin aralkylated with one or more compounds selected from the group consisting of styrene, alpha methyl styrene, beta methyl styrene, p-methyl styrene, alpha chloro styrene and vinyl naphthalenes.

22 Claims, 2 Drawing Sheets

RUBBER COMPOUNDING RESIN

CROSS REFERENCE TO RELATED APPLICATION

This is a continuation-in-part of co-pending U.S. patent application Ser. No. 07/214,325, filed July 1, 1988, entitled "IMPROVED RUBBER COMPOUNDING RESIN."

BACKGROUND OF THE INVENTION

1. Field of the Invention

The present invention relates to aralkyl substituted phenolic novolak resins, particularly aralkyl substituted resorcinol novolak resins which are used in rubber compounding resins to give improved mechanical properties and improved tire cord to rubber adhesion.

2. Brief Description of the Prior Art

In the manufacture of reinforced rubber products, such as automobile tires, it is important to have good adhesion between the rubber and the reinforcing material. Originally, adhesion of the rubber to the reinforcing material was promoted by pretreating the reinforcing material with certain adhesives. This proved unsatisfactory and it is now conventional to incorporate into the rubber during compounding various chemicals that react to improve the adhesion of the reinforcing materials and rubber during the vulcanization process. This compounding adhesion method is now generally practiced irrespective of whether the reinforcing materials are pretreated with adhesives or not.

The conventional method of compounding adhesion comprises compounding into the rubber before vulcanization a two part adhesive system. One part is a methylene donor compound that generates formaldehyde upon heating. The other part of the adhesive system is a methylene acceptor compound. During the vulcanization step the methylene donor upon heating releases formaldehyde and methylene acceptor reacts with the formaldehyde, rubber and reinforcing material with a resultant increase in adhesion of the rubber to the reinforcing materials. In addition, proper selection of the methylene donor and methylene acceptor can improve many other properties of the final product. The methylene donor and the methylene acceptor are compounded into the rubber and thus have a significant effect on the process of making the reinforced rubber product.

The methylene donor compounds are compounds that generate formaldehyde upon heating. Examples of the most commonly used compounds are hexamethylenetetramine and the various methyol melamines. There are many other suitable methylene donor compounds that may be used. Examples are set forth in U.S. Pat. No. 3,751,331.

Many different methylene acceptor compounds have been tried with various degrees of commercial success. Examples of the most common methylene acceptor compounds are resorcinol, resorcinol formaldehyde novolak resins, phenol formaldehyde novolak resins and phenol resorcinol formaldehyde novolak resins. While all of these methylene acceptor compounds will increase the adhesion of the rubber to the reinforcing materials, they have significant drawbacks.

As mentioned, resorcinol, resorcinol formaldehyde novolak resins and resorcinol phenol formaldehyde novolak resins have been used in the rubber compounding industry as methylene acceptors. These resorcinol containing compounds are unique materials for rubber compounding since they are not only good adhesion promoters but also act as thermosetting or vulcanizing plasticizers.

The thermosetting properties of resorcinol and resorcinol containing resins on curing yield a vulcanizate that has increased hardness, better abrasion resistance and improved aging resistance. The vulcanizate also has better solvent and oil resistance, is stiffer and gives improved finishes to the cured rubber. This combination of adhesion promotion and plasticizing makes the resorcinol containing methylene acceptors preferred compounds. In addition, as plasticizers the resorcinol containing compounds allow easier processing, higher loading and excellent extrusions for the rubber compounds. Even though resorcinol and resorcinol containing novolak resins provide improved adhesion, improved mechanical properties and improved processibility they are not without their drawbacks. For example the fuming and hygroscopicity of resorcinol containing methylene acceptors present problems in rubber compounding and handling.

To overcome these drawbacks manufacturers have been seeking modified resorcinolic derivatives that do not produce volatiles such as resorcinol at Banbury temperatures, are not hygroscopic and do not bloom. Several such compounds have been suggested.

U.S. Pat. No. 4,889,891 discloses an alkyl substituted resorcinol formaldehyde novolak. U.S. Pat. No. 4,605,696 discloses the use of resorcinol monoesters, particularly resorcinol monobenzoate. In U.S. Pat. No. 4,892,908 there is disclosed the use of keto derivatives of resorcinol such as benzoylresorcinol. In a co-pending application U.S. patent application Ser. No. 452,979, it is suggested that certain alkyl substituted phenol resorcinol formaldehyde novolak resins can be used to overcome the drawbacks of resorcinol.

Even though these resorcinol containing methylene acceptors may be useful there is always a need for improved methylene acceptor compounds. This is especially true of methylene acceptor compounds that provide a wide variety of desirable properties.

It is therefore an object of this invention to provide an improved methylene acceptor for use in rubber compounding. More particularly, it is the object of this invention to provide an improved methylene acceptor based on aralkylated novolak resins.

SUMMARY OF THE INVENTION

Figure 1:
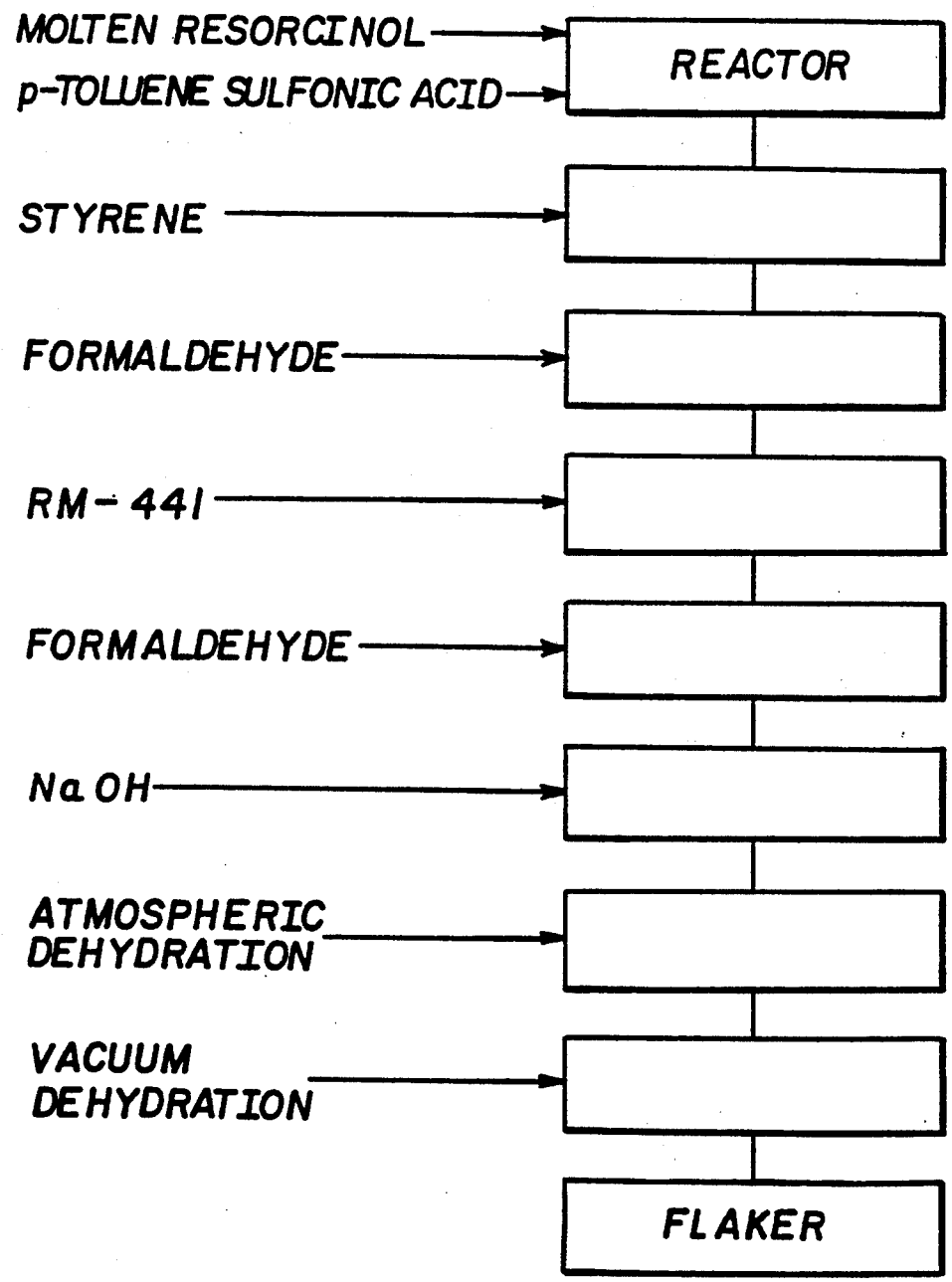
FIG. 1 is a flow diagram which illustrates a process which is one of the preferred embodiments of the present invention.

According to the present invention, it has been discovered that improved vulcanizable rubber compositions can be prepared when certain aralkylated phenolic novolak resins, particularly certain aralkylated resorcinol novolak resins, are used as the methylene acceptor. In accordance with the present invention, there is provided an improved vulcanizable rubber composition of the type comprising (I) a rubber component selected from natural and synthetic rubbers; and (II) a methylene donor compound which generates formaldehyde by heating; and (III) a phenolic novolak type methylene acceptor compound. The improvement comprises a phenolic novolak methylene acceptor wherein at least ten mole percent of the phenolic groups have been aralkylated with one or more compounds selected from the group consisting of styrene, alpha methyl styrene, beta methyl styrene, p-methyl styrene, alpha chloro styrene divinyl benzene and vinyl naphthalenes. The invention also provides an improved method for adhering rubber to reinforcing material using a methylene donor-methylene acceptor promotion system wherein the methylene acceptor is as described herein.

The rubber component of the present invention is any natural rubber, synthetic rubber or combination thereof. Examples of synthetic rubber include but are not limited to styrene butadiene copolymer polyisoprene, polybutadiene, acrylonitrile butadiene styrene, polychloroprene, isobutylene and ethylene propylene.

The vulcanizable rubber compositions of the present invention also include one or more of the normal additives used in such compositions. Examples of such additives include carbon black, cobalt salts, stearic acid, silica, silicic acid, sulfur, zinc oxide, fillers, antioxidants and softening oils.

The present invention is directed to improvements in the composition and process for adhering rubber to reinforcing materials. The reinforcing materials may optionally be pre-reacted or coated with adhesives and the like. The present invention has applicability whether or not the reinforcing materials are pre-coated or pre-reacted with adhesive materials. Examples of suitable reinforcing materials include nylon, rayon, polyester, polyamide, fiberglass, steel, brass coated steel and galvanized steel.

The methylene donor component of the present invention is any compound that generates formaldehyde upon heating during the vulcanization. Examples of such compounds are set forth in U.S. Pat. No. 3,751,331. Preferred methylene donor compounds are hexamethylenetetramine and the di to hexa methylol melamines. The methylol melamines may be completely or partially etherified or esterified such as hexamethoxymethylol melamine. The methylene donor is usually present in concentrations of from about 0.5 to 15 parts per one hundred parts rubber, preferably from 0.5 to 10 parts per one hundred parts rubber. The ratio of methylene donor to methylene acceptor is usually from 1:10 to 10:1.

As should be appreciated, the rubber component, additives, reinforcing materials and methylene donor compounds are the same as have been used in the prior art. In addition, the method of vulcanizing the compositions is the same as the prior art. The improvements of the present invention are related to the methylene acceptor.

The methylene acceptor of the present invention is a phenolic novolak resin having at least 10 mole percent of the phenolic groups aralkylated with one or more compounds selected from the group consisting of styrene, alpha methyl styrene, beta methyl styrene p-methyl styrene alpha chloro styrene, divinyl benzene and vinyl naphthalenes.

The phenolic novolak resins of the present invention are prepared by reacting one or more phenolic compositions selected from compounds represented by the general formula (a)

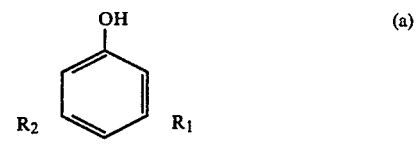

wherein $R_1$ and $R_2$ are independently selected from the group consisting of H, OH, $NH_2$, alkyl of 1-12 carbon atoms, $OCOR_3$ or $OR_3$ where $R_3$ is an alkyl or aryl group of 1-12 carbon atoms, or where $R_1$ and $R_2$ together represent a second aryl ring so the compound of formula (a) is beta-naphthol with one or more aldehyde or ketone compounds selected from the group consisting of formaldehyde, methyl formacel, acetaldehyde, propionaldehyde butraldehyde, crotanaldehyde, cinnamaldehyde, benzaldehyde, furfural, acetone and methyl ethyl ketone.

In the preferred embodiment of this invention the novolak resins are resorcinol novolak resins or resorcinol phenol novolak resins where resorcinol is the major phenolic type ingredient. The preferred embodiments also use formaldehyde or one of its equivalents such as paraformaldehyde or trioxane as the other reactant in preparing the novolak resins. In one preferred embodiment blends of resorcinol and resorcinol still bottoms are used to prepare the novolak resins.

The phenolic novolak resins must have at least 10 mole percent of the phenolic groups aralkylated with one or more compounds selected from the group consisting of styrene, alpha methyl styrene, beta methyl styrene, p-methyl styrene, alpha chloro styrene, divinyl benzene and vinyl naphthalenes. The phenolic novolak resins may have from 10 to 100 mole percent of the phenolic groups aralkylated. It is also possible to have two aralkyl groups on some of the phenolic groups. It is preferred that from 25 to 75 mole percent of the phenolic groups be aralkylated and that the phenolic groups are only mono-aralkylated. The exact amount of aralkyl groups will be determined by the desired properties of the final product. For example, high amounts of aralkyl groups may lower the softening point to an unacceptable level. The amount of aralkylation is chosen to give a softening point between 80° and 150° C. preferably between 80° and 120° C. The amount of aralkylation is also chosen to maximize the adhesion of the rubber to reinforcing material, and other properties such as the reactivity of the novolak resin with the methylene donor, the reactivity of the novolak resin to the double bonds in the rubber, the amount of fuming, the amount of blooming and the characteristics of the vulcanized product, i.e., the stiffness, etc.

The aralkyl group may be reacted onto the phenolic novolak resin after the phenolic novolak resin has been prepared. Alternatively the phenolic compound of formula (a) may be first aralkylated and then alone or with with additional phenolic compounds reacted with the ketone or aldehyde. It is also possible to simultaneously aralkylate part or all of the phenolic compound while reacting the same with the aldehyde or ketone. It is preferred to first aralkylate the phenolic compound and then react the aralkylated phenolic compound and additional phenolic compound with the aldehyde or ketone.

The aralkylation is carried out by reacting the phenolic compound of formula (a) or the phenolic novolak resin with the desired amount of olefin. The reaction of the phenolic group and the unsaturated hydrocarbon can be carried out in the presence or absence of solvents. Sometimes solvents may be beneficial. Examples of suitable solvents include benzene, toluene, xylene, ethylbenzene, alkyl alcohols and acetone.

In order to be commercially feasible the reaction of the unsaturated aryl containing hydrocarbon and the phenolic group must be catalyzed. Examples of suitable catalysts are Friedel Crafts catalysts or acid catalysts. The acid catalysts include the inorganic acids such as hydrochloric, sulfuric, phosphoric and phosphorous. The acid catalysts also include the alkyl and aryl sulfonic acids such as benzene sulfonic acid, benzene disulfonic acid, toluene sulfonic acid, xylene sulfonic acid and methane sulfonic acid. The preferred catalysts are the aryl sulfonic acid catalysts. The amount of catalyst is preferably in the range of 0.01 to 10 parts of catalyst per 100 parts of phenolic compound. The aralkylation is generally carried out at temperatures between 50° to 180° C.

In order to prepare the novolak resins of the present invention the phenolic compound is reacted with the aldehyde or ketone. This reaction can take place before or after the phenolic compound is aralkylated. It is preferred that the reaction take place after aralkylation. The molar ratio of aldehyde or ketone to phenolic compound may vary from about 0.5:1 to 1:1. Preferably the molar ratio of aldehyde or ketone to phenolic compound is from about 0.5:1 to 0.7:1.

The condensation reaction of the phenolic compound with the aldehyde or ketone may be carried out in the absence of a catalyst or in the presence of a catalyst. The preferred method is to carry out the reaction in the presence of conventional acid catalysts. Examples of suitable acids including preferred catalysts are set forth above. The reaction may preferably be carried out in the range of 50° to 200° C. The use of solvents is optional and suitable solvents are the same as set forth earlier.

The aralkylated phenolic novolak compounds are used as methylene acceptor compounds in conventional vulcanizable rubber compositions. The amount of aralkylated phenolic novolak resin is usually from 0.5 to 10 parts by weight per 100 parts by weight of rubber. Preferably the amount is from 1 to 5 parts. The vulcanizable rubber compositions are prepared and used in the conventional manner of preparing and using such compositions.

In preparing the preferred aralkylated phenolic novolak resins of the invention resorcinol and styrene are reacted at a molar ratio of 1 mole of resorcinol to 0.25 to 0.75 moles of styrene in presence of acid catalyst at about 120° C. Thereafter formaldehyde is added at a molar ratio of 0.5 to 0.7 and reacted at about 100° C., after which the reaction product is dehydrated.

In another method of preparing the preferred compounds resorcinol and formaldehyde are reacted at a molar ratio of 1 mole of resorcinol to 0.5 to 0.7 moles of formaldehyde at about 100° C. The reaction product is then dehydrated at atmospheric pressure at 140° C. Styrene at a molar ratio of 0.25 to 0.75 is then added to complete the reaction at 140°-150° C. Both reactions are run in the presence of suitable acid catalysts.

Referring to FIG. 1, one way to make the resin of the present invention is to first charge a reactor with molten resorcinol and an acid catalyst. After 10 minutes of mixing the resorcinol and catalyst, styrene would then be added streamwise for a period of from ¾ to 1¾ hours while the temperature is at 120°-140° C. After all the styrene has been added, the temperature is maintained at 120°-140° C. for ½ hour.

Part of the formaldehyde is then added to the reactor streamwise over a period of 2 to 2½ hours. The reaction is exothermic and controlled by the rate of formaldehyde addition. The reactor temperature is preferably kept between 100°-120° C. and it should not exceed 135° C. After all the formaldehyde is added the mixture is held at reflux for 15 minutes.

Thereafter a commercially available resorcinol still residue known as RM-441 is preferably added in 80% solution over ¼ to ½ hour to the reactor while the reaction mixture is maintained at 80°-100° C. About 27 grams of this solution would preferably be used for each mole of resorcinol used. RM-441 is a water-soluble residue obtained from the manufacture of resorcinol, alone or in admixture with one or more salts of aromatic sulfonic acid formaldehyde condensates. RM-441 has a typical composition of about 2%-8% (wt.) resorcinol, 12%-20% (wt.) dihydroxy diphenyl, 25%-35% (wt.) trihydroxy diphenyl, and the balance higher molecular weight polymers. RM-441 is commercially available from Indspec Chemical Corporation located at Pittsburgh, Pa. USA.

The remainder of the formaldehyde is then added streamwise for an additional time of ½ hour while the reaction mixture is maintained at 95°-100° C. After all formaldehyde is added the mixture is held at reflux for 15 minutes. For each mole of resorcinol used, about 0.08 moles of sodium hydroxide are then charged to the reactor. Atmospheric distillation is conducted until a temperature of 145° C. is reached. A vacuum is applied to the kettle. As a vacuum is applied, the temperature will drop and the resin will foam. The rate that vacuum is applied must be controlled so that the temperature does not drop below 125° C. and the resin does not foam into the vapor lines. When foaming has subsided, the vacuum should be applied in increments until full vacuum at least (95% or 715 mm Hg) is maintained. Pulling vacuum too rapidly may pull resin into the vapor header and condenser, plugging the condenser. When a temperature of 160° C. has been reached vacuum is released and the kettle emptied, after which the finished resin is transported to a flaker to reduce it to about ⅛-¼ inch flakes. It may alternatively be broken into small pieces or ground to about ¼ inch pieces.

Figure 2:
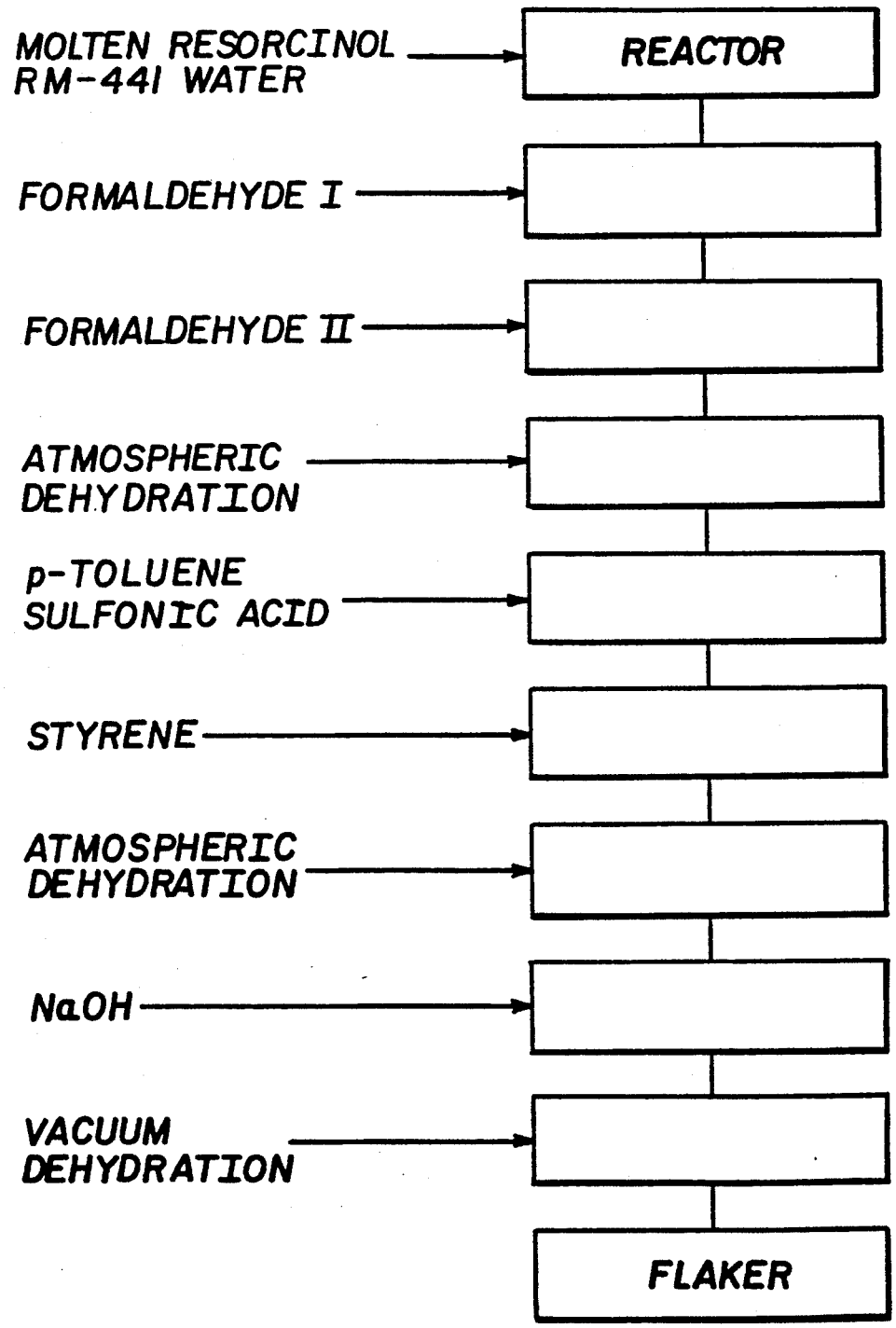
FIG. 2 is a flow diagram which illustrates a process which is an alternate embodiment of the present invention.

Referring to FIG. 2, the resin of the present invention may alternatively be produced by first charging water and resorcinol to the reactor. An agitator is used and, as necessary, the addition of resorcinol is stopped briefly to allow for the mixing of water and resorcinol. If the agitator labors or stalls heat may be put on the reactor, but the temperature of the mixture should not exceed 100° C. The resorcinol still residue 80% solution is then charged to the reactor and the mixture is heated to 100°-120°.

A 37% formaldehyde solution is then added to the mixture during an addition time of 2 to 2½ hours. The reaction is exothermic and is controlled by the rate of formaldehyde addition. Reactor temperature should not be allowed to exceed 135° C.

The formaldehyde is added in two increments, and when all of the first amount of formaldehyde has been added to the reactor, mixing is conducted for 10-15 minutes and a sample is withdrawn for a viscosity check. A high-intensity light may be required to see the bubble. The viscosity should be 30-36 Gardner Holdt seconds at 23° C. If the results obtained are not within this range, an adjustment in the second formaldehyde charge may be necessary.

When all of the second amount of formaldehyde has been charged, the mixture is agitated for 10 minutes, a sample is withdrawn and viscosity checked. This result should be 45-85 seconds. If viscosity is not within this range, additional formaldehyde or resorcinol is added to obtain an endpoint within the acceptable range. The ideal endpoint would be 63 seconds.

Reactor valves are set for atmospheric distillation and atmospheric distillation is continued until a temperature of 110° is reached. When the reactor temperature reaches 110° C., p-toluene sulfonic acid is charged. Styrene is then added streamwise over a period of one hour. Distillation is continued during styrene addition and styrene is retained from water styrene azeotrope while removing water. When a temperature of 140° C. has been reached, the temperature is held at 140°-145° C. for 30 minutes.

The kettle is switched to vacuum distillation. A vacuum is slowly applied to the kettle. As the vacuum is applied, the temperature will drop and the resin will foam. The rate that the vacuum is applied must be controlled so that the temperature does not drop below 125° C. and the resin does not foam into the vapor lines. When foaming has subsided, the vacuum should be applied in increments until full vacuum at least (95% or 715 mm Hg) is maintained. Pulling the vacuum too rapidly may pull resin into the vapor header and condenser, plugging the condenser When a temperature of 160° C. has been reached, the vacuum is released and the kettle is emptied. The completed resin is then flaked, broken into small pieces or ground to about ¼ inch pieces.

The present invention is further illustrated by the following examples.

EXAMPLE 1

440.4 grams of resorcinol was charged to a flask and heated to 125° C. 0.8 g. of p-toluene sulfonic acid was then added and mixed for 10 minutes. 145 g. of styrene was then charged to the flask streamwise over a period of about 1 · hour. Temperature was maintained at 125°-135° C. for 1 hour after all of the styrene had been added. A 37% formaldehyde solution in the amount of 220 g. was then charged to the reactor streamwise over a period of 30 minutes at a temperature of 100°-125° C. After all the formaldehyde was added, the mixture was held at reflux for 15 minutes. Then 0.2 g. of a 50% solution of sodium hydroxide was added and water was then removed by atmospheric distillation to 145° C. and vacuum was applied and distillation continued to 160° C. When a temperature of 160° C. was reached, the vacuum was released and the flask emptied. The resulting resins had a softening point of 123° C. and a moisture content of 0.2%. Free resorcinol was 3.4 percent. The compound made by the reaction of resorcinol and styrene in the above described manner was identified by infrared (IR) and proton magnetic resonance (NMR) procedures and found to have the following structure:

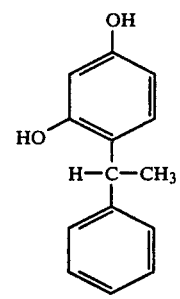

The novolak resin compound made as the product of the entire above described procedure was analyzed by infrared (IR) and proton magnetic resonance (NMR) procedures and identified as having repeating units represented by the following structure:

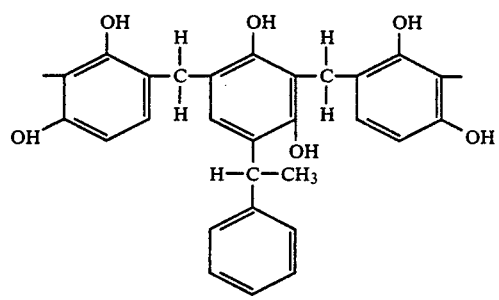

This disclosed resin was evaluated in a silica/black natural rubber compound. The control compound did not contain resorcinol formaldehyde resin. The RF resin is a resorcinol-formaldehyde resin rubber curing agent commercially available from Indspec Chemical Corporation, Pittsburgh, Pa. Rheometer cure, hardness, tensile adhesion and fuming characteristics were evaluated. The results of this test are shown in Table 1.

TABLE 1

| Property/Test | Control | RF Resin | Example 1 Product |
|---|---|---|---|
| Rheometer Cure (ASTM D-2084) | | | |
| MH (lbs.) | 37.3 | 41.2 | 37.6 |
| ML (lbs.) | 8.8 | 13.0 | 12.9 |
| $t_s2$ (scorch time) (min.) | 5.0 | 2.8 | 3.5 |
| t' 90 (cure time) (min.) | 15.3 | 32.5 | 39.0 |
| Tensile (ASTM D-412) | 1509 | 1687 | 1719 |
| 300% Modulus (psi) | 3809 | 2964 | 3178 |
| Ultimate Elong. (%) | 690 | 555 | 565 |
| Adhesion (ASTM D-2229) BW-49 Wire (Low Copper 63.5% Copper, 4.9 g./Kg plating) | | | |
| Unaged | 243(70) | 299(90) | 310(90) |
| Steam (24 hrs.) | 243(70) | 258(70) | 247(70) |
| Humidity (14 day) | 223(10) | 238(70) | 265(70) |
| Fuming (@250° C.) | not detected visually | not detected visually | not detected visually |

EXAMPLE 2

440 g. of resorcinol was charged to a flask and heated to 120°-130° C. 0.7 g. of p-toluene sulfonic acid was then charged and mixed for ten minutes at 120°-130° C. A 37% formaldehyde solution in the amount of 220.4 g. was charged over a period of 1 hour. When all of the formaldehyde was charged the flask was set for atmospheric distillation and atmospheric distillation was continued until a temperature of 140° C. was reached. When reactor temperature reached 140° C., 145.3 g. of styrene was added streamwise over a period of 90 minutes. Temperature was maintained at 135°-140° C. and held at 140°-150° C. for 1 hour after all the styrene had been added. The flask was then switched to vacuum distillation. When a temperature of 160° C. was reached, the vacuum was released and the flask emptied. The resulting resin had a softening point of 122° C. and a moisture content of 0.05%. Free resorcinol was 5.4%. A test similar to the one conducted on the product of the foregoing example was conducted on this product of this example. The results of this test are shown in Table 2.

TABLE 2

| Property/Test | Control | RF Resin | Example 2 Product |
|---|---|---|---|
| Rheometer Cure (ASTM D-2084) | | | |
| MH (lbs.) | 36.2 | 39.3 | 36.4 |
| ML (lbs.) | 8.7 | 11.2 | 11.0 |
| $t_s$ 2 (scorch time) (min.) | 5.3 | 2.5 | 3.5 |
| t' 90 (cure time) (min.) | 15.5 | 34.5 | 39.0 |
| Tensile (ASTM D-412) | | | |
| 300% Modulus (psi) | 1427 | 1651 | 1689 |
| Tensile Strength (psi) | 3759 | 3190 | 3290 |
| Ultimate Elong. (%) | 700 | 600 | 600 |
| Adhesion (ASTM D-2229) BW-49 Wire (Low Copper - 63.5%, 4.9 g./Kg plating) | | | |
| Unaged | 214(70) | 324(95) | 307(90) |
| Steam (24 hrs. @120° C.) | 221(90) | 237(60) | 235(65) |
| Humidity (14 day @70° C., 95%) | 199(60) | 217(80) | 190(75) |
| Fuming (@250° C.) | not detected visually | detected visually | not detected visually |

EXAMPLES 3-6

The procedure of Example 1 was repeated four times except the amount of styrene used was varied as is shown in Table 3. The percentage of free resorcinol and the softening points of the resulting resins were measured and are shown in Table 3.

TABLE 3

| Example | Styrene (g.) | Free Resorcinol (%) | Softening Point (°C.) |
|---|---|---|---|
| 3 | 0.0 | 13.5 | 126.6 |
| 4 | 145.0 | 3.4 | 125.9 |
| 5 | 184.8 | 3.1 | 124.7 |
| 6 | 206.6 | 1.1 | 121.5 |

EXAMPLES 7-9

The procedure of Example 1 was repeated three more times except that the 440.4 g. of resorcinol, 0.8 g. p-toluene sulfonic acid, 204 g. of 37% formaldehyde solution and 0.3 g. of sodium hydroxide were used and the amount of styrene was varied as is shown in Table 4. The percentage of free resorcinol and the softening points of the resulting resins were measured and are shown in Table 4.

TABLE 4

| Example | Styrene (g.) | Free Resorcinol (%) | Softening Point (°C.) |
|---|---|---|---|
| 7 | 0.0 | 15.5 | 114.8 |
| 8 | 145.0 | 7.9 | 112.6 |
| 9 | 224.0 | 2.5 | 112.0 |

EXAMPLES 10-15

The procedure of Example 2 was repeated six times except the amount of styrene used was varied as is shown in Table 5. The percentage of free resorcinol and the softening points of the resulting resins were measured and are shown in Table 5.

TABLE 5

| Example | Styrene (g.) | Free Resorcinol (%) | Softening Point (°C.) |
|---|---|---|---|
| 10 | 0.0 | 13.5 | 126.6 |
| 11 | 60.0 | 9.0 | 127.4 |
| 12 | 79.2 | 7.4 | 124.8 |
| 13 | 110.0 | 5.4 | 122.6 |
| 14 | 145.2 | 2.6 | 118.7 |
| 15 | 149.2 | 1.7 | 117.0 |

EXAMPLES 16-18

The procedure of Example 2 was repeated three more times except that 440.9 g. of resorcinol, 0.8 g. of p-toluene acid, 204.0 g. of 37% formaldehyde solution and 0.3 g. of 50% sodium hydroxide solution were used, and the amount of the amount of styrene used was varied as is shown in Table 6. The percentage of free resorcinol and the softening points of the resulting resins were measured and are shown in Table 6.

TABLE 6

| Example | Styrene (g.) | Free Resorcinol (%) | Softening Point (°C.) |
|---|---|---|---|
| 16 | 0.0 | 15.5 | 114.8 |
| 17 | 88.0 | 9.1 | 112.3 |
| 18 | 158.4 | 3.6 | 109.4 |

EXAMPLE 19

198 pounds of resorcinol was charged to a reactor and heated to 120°-130° C. 0.3 pounds (147 grams) of p-toluene sulfonic acid was then similarly charged and mixed for 10 minutes at 120°-130° C. Styrene (72.7 lbs.) was then charged to the reactor streamwise. The resulting reaction was exothermic and was controlled by the rate of styrene addition. The addition time was about 1 hour. Temperature was maintained at 125°-135° C. for the reaction and then held at 135°-145° C. for ½ hour after all of the styrene had been added. A 37% formaldehyde solution in the amount of 89.4 pounds was then charged to the reactor streamwise. The resulting reaction was exothermic and was controlled by the rate of formaldehyde addition. The reactor temperature was not allowed to exceed 135° C. Addition time for formaldehyde was about 2 hours. After all the formaldehyde was added, the mixture was held at reflux for 15 minutes. An 80% solution of RM-441 then was charged to the reactor streamwise in an amount of 27.5 pound. Addition time was about ½ hour. An additional 11.4 pounds of 37% formaldehyde solution was then added to the reactor streamwise. Addition time was about ½ hour. After all the formaldehyde had been added, the mixture was held at reflux for ¼ hour. 2 pounds of a 50% sodium hydroxide solution was then added and reactor valves were set for atmospheric distillation. Atmospheric distillation was continued until a temperature of 145° C. was reached. The kettle was then switched to vacuum distillation. The rate that the vacuum was applied was controlled so that the temperature did not drop below 125° C. and the resin did not foam into the vapor lines. When a temperature of 160° C. was reached, the vacuum was released and the kettle emptied. The resulting resins from several batches had a softening point of 117°–123° C. and a moisture content of 0.7%. The pH of a 40% aqueous alcohol solution was 5.0–6.0. Free resorcinol was 2.5–3.5%.

EXAMPLE 20

9.7 pounds of water was charged to the reactor followed by 185.2 pounds of technical grade resorcinol. After each 50 pounds, or as needed, the addition was stopped and the agitator run briefly until the resorcinol and water were mixed after which charging was resumed. 25.7 pounds of an 80% solution of RM-441 was then charged to the reactor and the mixture was heated to 100°–120° C. 89.4 pounds of a formaldehyde solution was then added to the reactor streamwise. The resulting reaction was exothermic and was controlled by the rate of formaldehyde addition. The reactor temperature was not allowed to exceed 135° C. Addition time for the formaldehyde was between 2 to 2½ hours. When all of the formaldehyde has been added to the reactor it was mixed for 10 minutes and a sample was withdrawn for a viscosity check. The viscosity was between 30–36 seconds at 23° C. Another 4.7 pounds of 37% formaldehyde solution was then added streamwise. When all of the second amount of formaldehyde was charged, the mixture was agitated for 10 minutes. A sample was withdrawn and viscosity checked. The results were from 45–85 seconds. Reactor valves were set for atmospheric distillation and continued until a temperature of 100° C. was reached. When reactor temperature reached 110° C. 1.2 pounds of p-toluene sulfonic acid were charged 83.3 pounds of styrene were added streamwise over a period of one hour. Distillation was continued during styrene addition and styrene was returned from water styrene azeotrope while water was removed. Once a temperature of 140° C. was reached, the reaction was held at 140°–145° C. for 30 minutes. The kettle was switched to vacuum distillation. The rate that the vacuum was applied was controlled so that the temperature did not drop below 125° C. and the resin did not foam into the vapor lines. When a temperature of 160° C. was reached, the vacuum was released and the kettle was emptied. The resulting resin had a softening point of 117°–128° C. and a moisture content of 0.7%. The pH of a 50% aqueous/alcohol solution was from 5.0–6.0. It had 2.5–3.5% free resorcinol.

EXAMPLE 21

Into a 2-liter reaction kettle equipped with a stirrer, thermometer, reflux condenser and addition funnel, 420.0 grams of resorcinol were charged and heated to 120°–130° C. p-Toluene sulfonic acid (1.45 grams) was then added at 120° C. and mixed for 5 minutes. Then 280.0 grams of styrene were charged to the molten resorcinol streamwise over a period of about 90 minutes. The temperature of the reaction mixture was maintained between 115°–135° C. during the styrene addition. After all the styrene has been added, the reaction mixture was maintained at this temperature for additional 60–90 minutes. Then 210.0 grams of 37% aqueous formaldehyde solution was added slowly into the kettle over a period of 60–90 minutes at 95°–120° C. The reaction mixture was held at reflux for 15–30 minutes more. After this reflux period, 40.0 grams of additional resorcinol and 52.5 grams of 80% aqueous RM-441 solution were added at once and continued the reaction for additional 60 minutes. Finally water was removed under reduced pressure to give the Resin 21 having a softening point of 102.6° C.

EXAMPLE 22

Into a 2-liter reaction kettle equipped with a stirrer, thermometer, reflux condenser and addition funnel, 420.0 grams of resorcinol were charged and heated to 120°–130° C. p-Toluene sulfonic acid (1.45 grams) was then added at 120° C. and mixed for 5 minutes. Then 360.0 grams of styrene were charged to the molten resorcinol streamwise over a period of about 90 minutes. The temperature of the reaction mixture was maintained between 115°–135° C. during the styrene addition. After all the styrene has been added the reaction mixture was maintained at this temperature for additional 60–90 minutes. Then 210.0 grams of 37% aqueous formaldehyde solution was added slowly into the kettle over a period of 60–90 minutes at 95°–120° C. The reaction mixture was held at reflux for 15–30 minutes more. After this reflux period, 40.0 grams of additional resorcinol and 51.5 grams solid RM-441 were added at once and continued the reaction for additional 60 minutes. Finally water was removed under reduced pressure to give Resin 22 having a softening point of 105.4° C.

EXAMPLE 23

Into a 2-liter reaction kettle equipped with a stirrer, thermometer, reflux condenser and addition funnel, 440.0 grams of resorcinol were charged and heated to 120°–130° C. p-Toluene sulfonic acid (2.0 grams) was then added at 120° C. and mixed for 5 minutes. Then 458.3 grams of styrene were charged to the molten resorcinol streamwise over a period of about 90 minutes. The temperature of the reaction mixture was maintained between 115°–135° C. during the styrene addition. After all the styrene has been added, the reaction mixture was maintained at this temperature for additional 60–90 minutes. Then 194.6 grams of 37% aqueous formaldehyde solution was added slowly into the kettle over a period of 60–90 minutes at 95°–120° C. The reaction mixture was held at reflux for 15–30 minutes more. After this reflux period, 20.0 grams of additional resorcinol and 55.0 grams of 80% aqueous RM-441 solution were added at once and continued the reaction for additional 60 minutes. Finally, 1.0 gram of 50% aqueous sodium hydroxide solution was added and then water was removed under reduced pressure to give Resin 23 having a softening point of 99° C.

EXAMPLE 24

Into a 2-liter reaction kettle equipped with a stirrer, thermometer, reflux condenser and addition funnel, 440.0 grams of resorcinol were charged and heated to 120°–130° C. p-Toluene sulfonic acid (3.0 grams) was then added at 120° C. and mixed for 5 minutes. Then 625.0 grams of styrene were charged to the molten resorcinol streamwise over a period of about 90 minutes. The temperature of the reaction mixture was maintained between 115°–135° C. during the styrene addition. After all the styrene has been added, the reaction mixture was maintained at this temperature for additional 60-90 minutes. Then 162.2 grams of 37% aqueous formaldehyde solution was added slowly into the kettle over a period of 60-90 minutes at 95°-120° C. The reaction mixture was held at reflux for 15-30 minutes more. After this reflux period, 20.0 grams of additional resorcinol and 55.0 grams of 80% aqueous RM-441 solution were added at once and continued the reaction for additional 60 minutes. Finally, 1.5 gram of 50% aqueous sodium hydroxide solution was added and then water was removed under reduced pressure to give Resin 24 having a softening point of 86.4° C.

EXAMPLE 25

Into a 2-liter reaction kettle equipped with a stirrer, thermometer, reflux condenser and addition funnel, 40.0 grams of resorcinol were charged and heated to 120°-130° C. p-Toluene sulfonic acid (2.0 grams) was then added at 125° C. and mixed for 5 minutes. Then 236.4 grams of 4-methyl styrene were charged to the molten resorcinol streamwise over a period of about 90 minutes. The temperature of the reaction mixture was maintained between 125°-145° C. during the 4-methyl styrene addition After all the 4-methyl styrene has been added, the reaction mixture was maintained at this temperature for additional 60-90 minutes. Then 194.6 grams of 37% aqueous formaldehyde solution was added slowly into the kettle over a period of 60-90 minutes at 90°-110° C. The reaction mixture was held at reflux for 15-30 minutes more. After this reflux period, 55.0 grams of 80% aqueous RM-441 solution was added at once and continued the reaction for additional 60 minutes. Finally, the solvent was removed under reduced pressure to give Resin 25 having a softening point of 110.1° C.

EXAMPLE 26

Into a 2-liter reaction kettle equipped with a stirrer, thermometer, reflux condenser and addition funnel, 220.0 grams of resorcinol, 2.0 grams of p-toluene sulfonic acid and 300.0 grams of toluene were charged. Then the contents of the kettle were heated to reflux and added 94.6 grams of alpha-methyl styrene slowly for a period of 60-90 minutes. After all the alpha-methyl styrene has been added, the reaction mixture was maintained at this temperature for additional 30 minutes. Then 105.4 grams of 37% aqueous formaldehyde solution was added slowly into the kettle over a period of 30-60 minutes at reflux. The reaction mixture was held at reflux for 15-30 minutes more. After this reflux period, 26.5 grams of 80% aqueous RM-441 solution was added at once and continued the reaction for additional 60 minutes. Finally, the solvent was removed under reduced pressure to give Resin 26 having a softening point of 116.4° C.

EXAMPLE 27

Into a 2-liter reaction kettle equipped with a stirrer, thermometer, reflux condenser and addition funnel, 488.7 grams of 3,5-dimethyl phenol were charged and heated to 120°-130° C. p-Toluene sulfonic acid (3.0 grams) was then added at 125° C. and mixed for 5 minutes. Then 208.4 grams of styrene were charged to the molten 3,5-dimethyl phenol streamwise over a period of about 90 minutes. The temperature of the reaction mixture was maintained between 115°-135° C. during the styrene addition. After all the styrene has been added, the reaction mixture was maintained at this temperature for additional 60-90 minutes. Then 100.0 grams of methanol were added first followed by the slow addition of 210.8 grams of 37% aqueous formaldehyde solution was added slowly into the kettle over a period of 60-90 minutes at 80°-110° C. The reaction mixture was held at reflux for 15-30 minutes more. After this reflux period, 1.5 gram of 50% aqueous sodium hydroxide solution was added. Finally the solvents were removed under reduced pressure to give Resin 27 having a softening point of 60.3° C.

EXAMPLE 28

Into a 2-liter reaction kettle equipped with a stirrer, thermometer, reflux condenser and addition funnel, 440.0 grams of resorcinol were charged and heated to 120°-130° C. p-Toluene sulfonic acid (2.0 grams) was then added at 120° C. and mixed for 5 minutes. Then 84.1 grams of 4-vinyl pyridine were charged to the molten resorcinol streamwise over a period of about 90 minutes. The temperature of the reaction mixture was maintained between 120°-130° C. during the vinyl pyridine addition. After all the vinyl pyridine has been added, the reaction mixture was maintained at this temperature for additional 60-90 minutes. Then 163.0 grams of 37% aqueous formaldehyde solution was added slowly into the kettle over a period of 60-90 minutes at 95°-120° C. The reaction mixture was held at reflux for 60 minutes more. Finally, the water was removed under reduced pressure to give Resin 28 having a softening point of 105.9° C.

EXAMPLE 29

Into a 2-liter reaction kettle equipped with a stirrer, thermometer, reflux condenser and addition funnel, 440.0 grams of resorcinol were charged and heated to 120°-130° C. p-Toluene sulfonic acid (4.0 grams) was then added at 120° C. and mixed for 5 minutes. Then 166.6 grams of styrene were charged to the molten resorcinol streamwise over a period of about 90 minutes. The temperature of the reaction mixture was maintained between 115°-135° C. during the styrene addition. After all the styrene has been added, the reaction mixture was maintained at this temperature for additional 60-90 90 minutes. Then 151.0 grams of acetone were added slowly into the kettle over a period of 90-120 minutes at 70°-90° C. The reaction mixture was held at reflux for 180 minutes more. Finally water was removed under reduced pressure to give Resin 29 having a softening point of <50° C.

EXAMPLE 30

Into a 2-liter reaction kettle equipped with a stirrer, thermometer reflux condenser and addition funnel, 440.0 grams of resorcinol were charged and heated to 120°-130° C. p-Toluene sulfonic acid (3.0 grams) was then added at 120° C. and mixed for 5 minutes. Then 166.6 grams of styrene were charged to the molten resorcinol streamwise over a period of about 90 minutes. The temperature of the reaction mixture was maintained between 115°-135° C. during the styrene addition. After all the styrene has been added the reaction mixture was maintained at this temperature for additional 60-90 minutes. Then 58.1 grams of acetone were added slowly into the kettle over period of 60-90 minutes at 70°-90° C. The reaction mixture was held at reflux for 60 minutes after acetone addition before 129.7 grams of 37% aqueous formaldehyde solution was added into the reaction mixture over a period of 60-90 minutes at 90°–110° C. The reaction mixture was again held at reflux for 30 minutes more. After this 55.0 grams of 80% aqueous RM-441 solution was added at once and continued the stirring for additional 60 minutes. Finally 1.5 gram of 50% aqueous sodium hydroxide solution was added and water was removed under the reduced pressure to give Resin 30 having a softening point of 92° C.

EXAMPLE 31

Into a 2-liter reaction kettle equipped with a stirrer, thermometer, reflux condenser and addition funnel, 440.0 grams of resorcinol were charged and heated to 120°–130° C. p-Toluene sulfonic acid (1.5 grams) was then added at 120° C. and mixed for 5 minutes. Then 125.0 grams of styrene were charged to the molten resorcinol streamwise over a period of about 90 minutes. The temperature of the reaction mixture was maintained between 115°–135° C. during the styrene addition. After all the styrene has been added, the reaction mixture was maintained at this temperature for additional 60–90 minutes. Then 229.1 grams of 50% aqueous acetaldehyde solution was added slowly into the kettle over a period of 60–90 minutes at 80°–110° C. The reaction mixture was held at reflux for 15–30 minutes more. After this reflux period, 55.0 grams of 80% aqueous RM-441 solution were added at once and continued the reaction for additional 60 minutes. Finally, 0.7 gram of 50% aqueous sodium hydroxide solution was added and then water was removed under reduced pressure to give Resin 31 having a softening point of 88.3° C.

EXAMPLE 32

Into a 500 mL reaction kettle were charged 110 grams of resorcinol and 48.6 grams of 37% an aqueous formaldehyde solution and refluxed for 5.0 hours. After the reflux period water was distilled out at 135° C. under reduced pressure to give Resin 32 having a softening point of 103° C.

EXAMPLE 33

Black natural rubber compounds were prepared in three stages to test the adhesion and reinforcing effects of the resins prepared. The basic compound formulation is shown in Table 7.

TABLE 7

| Rubber Compound Used in Reinforcing and Adhesion Tests | |
|---|---|
| Masterbatch | Parts by Weight |
| Natural Rubber SMRCV60 | 100.0 |
| HAF Black N-326 | 55.0 |
| Zinc oxide | 8.0 |
| Stearic acid | 1.2 |
| N-(1,3-Dimetylbutyl)-N'-Phenyl-p-Phenylenediamine | 2.0 |
| Polymerized 1,2-Dihydro-2,2,4-Trimethylquinoline | 1.0 |
| N-(Cyclohexylthio) Phthalimide | 0.2 |
| Resorcinolic Resins | 3.5 |
| Cobalt Naphthenate (12%) | 0.83 |
| Insoluble Sulfur (80%) | 4.69 |
| N-t-Butyl-2-benzothiozolesulfenamide | 0.60 |
| Methylene Donor[1] | 2.5 |

[1]Hexamethoxymethylmelamine (65% HMMM)

In the first stage, the black masterbatch was mixed in a Size 3 Banbury mixer to a dump temperature of 143° C. and sheeted to a thickness of 10 mm. In the second stage, an appropriate amount of the black masterbatch for each compound was mixed with the required level of resorcinolic resin and cobalt compound on a two roll lab mill at 118°–124° C. The compounds were sheeted and cooled. The sulfur, accelerator and appropriate amount of HMMM were added to the compound in the third stage, using the two roll mill at 90°–110° C. The compounds were aged overnight in a constant temperature room at 23° C. and relative humidity before testing.

Cure characteristics for each compound were determined with a Monsanto 100 Rheometer at 149° C.; 1 arc and 1.67 Hz according to ASTM D2084-81 method.

The Rheometer cure data, adhesion data and dynamic mechanical data for the cured rubber samples are given in Table 8.

TABLE 8

| Rubber Compound Properties | | | |
|---|---|---|---|
| Property/Test | Control Resin 32 | Resin 21 | Resin 22 |
| Rheometer Cure (ASTM D-2084) | | | |
| MH, in-lb. | 52.3 | 56.9 | 54.7 |
| ML, in-lb. | 9.1 | 8.8 | 8.5 |
| ts 2, minutes | 3.5 | 3.9 | 3.8 |
| t' 90, minutes | 14.2 | 16.8 | 16.3 |
| Tensile (ASTM D-412) Unaged: | | | |
| 200% Modulus (psi) | 1270 | 1292 | 1398 |
| Tensile Strength (psi) | 3332 | 3564 | 3617 |
| Ultimate Elongation (%) | 452 | 476 | 468 |
| Heat Aged (3 days at 100° C.) | | | |
| 200% Modulus (psi) | 1168 | 1121 | 1121 |
| Tensile Strength (psi) | 1828 | 1613 | 1716 |
| Ultimate Elongation (%) | 162 | 144 | 157 |
| Adhesion (ASTM D-2229) lbs. (% rubber coverage) 7 × 4 × 0.175 mm wire: 63.5% copper, 4.9 g./Kg plating | | | |
| Unaged | 279(89) | 264(89) | 261(85) |
| Steam, 24 hours at 120° C. | 244(90) | 284(95) | 277(90) |
| Humidity (21 days, 85° C., 95% RH) | 229(90) | 248(90) | 252(90) |
| Dynamic Mechanical[1,2] | | | |
| G' at 0.2% Strain, MPa | 31.87 | 40.13 | 35.82 |
| G" at 2.0% Strain, MPa | 38.60 | 45.66 | 41.55 |

[1]Cured to t' 90 at 150° C.
[2]Rheometrics Mechanical Spectrometer 800, 1.0 Hz, RT.

This data clearly demonstrates that the resins of this invention improve the mechanical properties of the cured rubber compound while maintaining adhesion properties comparable to the resorcinol-formaldehyde resin.

Although the invention has been described with some particularity, it is to be understood that the scope of the invention is defined by what is hereafter claimed.

We claim:

1. An improved vulcanizable rubber composition of the type comprising (I) a rubber component selected from natural rubber, synthetic rubber or combinations thereof, and (II) a methylene donor compound which generates formaldehyde upon heating, and (III) a phenolic novolak resin type methylene acceptor compound; wherein the improvement comprises using a phenolic novolak resin having at least a portion of the phenolic compounds being aralkylated with one or more compounds selected from the group consisting of styrene, alpha methyl styrene, beta methyl styrene, p-methyl styrene, alpha chloro styrene, and vinyl naphthalenes.

2. An improved composition as in claim 1 wherein the phenolic novolak resin has from about 14 to about 100 mole percent of the phenolic compounds being aralkylated.

3. An improved composition as in claim 1 wherein the phenolic novolak resin has been aralkylated with styrene.

4. An improved composition as in claim 1 wherein the methylene donor is selected from the group consisting of hexamethylenetetramine, methylol melamines, etherified methylol melamines and esterified methylol melamines.

5. An improved vulcanizable rubber composition of the type comprising (I) a rubber component selected from natural rubber, synthetic rubber or combinations thereof, and (II) a methylene donor compound which generates formaldehyde upon heating, and (III) a phenolic novolak resin type methylene acceptor compound prepared by reacting one or more phenolic compounds represented by formula (a)

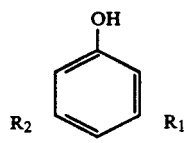

(a)

where $R^1$ and $R^2$ are independently selected from the group consisting of H, OH, $NH_2$, alkyl of 1-12 carbon atoms, $OCOR_3$ or $OR_3$ where $R_3$ is an alkyl or aryl group of 1-12 carbon atoms, or where $R_1$ and $R_2$ together form a second aryl ring so the compound of formula (a) is beta-naphthol with an aldehyde or ketone selected from the group consisting of formaldehyde, acetaldehyde, propionaldehyde, butraldehyde, crotanaldehyde, cinnamaldehyde, benzaldehyde, furfural, acetone and methyl ethyl ketone; wherein the improvement comprises at least a portion of the phenolic compound of formula (a) being aralkylated with one or more compounds selected from the group consisting of styrene, alpha methyl styrene, beta methyl styrene, p-methyl styrene, alpha chloro styrene, divinyl benzene and vinyl naphthalenes.

6. An improved composition as in claim 5 wherein the phenolic novolak resin has from about 14 to about 100 mole percent of the phenolic compounds being aralkylated.

7. An improved composition as in claim 5 wherein the phenolic novolak resin has been aralkylated with styrene.

8. An improved composition as in claim 5 wherein the methylene donor is selected from the group consisting of hexamethylenetetramine, methylol melamines, etherified methylol melamines and esterified methylol melamines.

9. An improved composition as in claim 5 wherein the phenolic compound is aralkylated before it is reacted with the aldehyde or ketone.

10. An improved vulcanizable rubber composition of the type comprising (I) a rubber component of the type comprising (I) a rubber component selected from natural rubber, synthetic rubber or combinations thereof, and (II) a methylene donor compound which generates formaldehyde upon heating, and (III) a methylene acceptor compound comprising a resorcinol formaldehyde or phenol resorcinol formaldehyde novolak resin; wherein the improvement comprises at least a portion of the phenol or resorcinol being aralkylated with one or more compounds selected from the group consisting of styrene, alpha methyl styrene, beta methyl styrene, p-methyl styrene, alpha chloro styrene, divinyl benzene and vinyl naphthalenes.

11. An improved composition as in claim 10 wherein from 14 to about 100 mole percent of the phenol or resorcinol has been aralkylated.

12. An improved composition as in claim 10 wherein the phenol or resorcinol has been aralkylated with styrene.

13. An improved composition as in claim 10 wherein the phenol or resorcinol is aralkylated before it is reacted with formaldehyde to form the novolak resin.

14. An improved composition as in claim 10 wherein the methylene donor is selected from the group consisting of hexamethylenetetramine, methylol melamines etherified methylol melamines and esterified methylol melamines.

15. An improved composition as in claim 10 wherein the novolak resin contains a water-soluble residue comprising about 2%-8% (wt.) resorcinol, 12%-20% (wt.) dihydroxy diphenyl, 25%-35% (wt.) trihydroxy diphenyl, and the balance higher molecular weight polymers.

16. An improved vulcanizable rubber composition of the type comprising (I) a rubber compound selected from natural rubber, synthetic rubber or combinations thereof, and (II) a methylene donor compound which generates formaldehyde upon heating, and (III) a methylene acceptor compound comprising a resorcinol formaldehyde novolak resin; wherein the improvement comprises at least a portion of the resorcinol being aralkylated with one or more compounds selected from the group consisting of styrene, alpha methyl styrene, p-methyl styrene, alpha chloro styrene, divinyl benzene and vinyl naphthalenes.

17. An improved composition as in claim 16 wherein from about 14 to about 100 mole percent of the resorcinol has been aralkylated.

18. An improved composition as in claim 16 wherein the resorcinol has been aralkylated with styrene.

19. An improved composition as in claim 16 wherein the resorcinol is aralkylated with styrene before it is reacted with formaldehyde to form the novolak resin.

20. An improved composition as in claim 16 wherein the resorcinol formaldehyde novolak has a molar ratio of resorcinol to formaldehyde of from 1:0.7 to 1:0.5.

21. An improved composition as in claim 16 wherein the methylene donor is selected from the group consisting of hexamethylenetetramine, methylol melamines etherified methylol melamines and esterified methylol melamines.

22. An improved composition as in claim 16 wherein the resorcinol formaldehyde novolak contains a water-soluble residue comprising about 2%-8% (wt.) resorcinol, 12%-20% (wt.) dihydroxy diphenyl, 25%-35% (wt.) trihydroxy diphenyl, and the balance higher molecular weight polymers.

* * * * *

UNITED STATES PATENT AND TRADEMARK OFFICE
CERTIFICATE OF CORRECTION

PATENT NO. : 5,021,522

DATED : June 4, 1991

INVENTOR(S) : BOJAYAN DURAIRAJ et al.

It is certified that error appears in the above-identified patent and that said Letters Patent is hereby corrected as shown below:

Column 3, line 16, a comma --,-- should be inserted after "copolymer".

Column 3, line 43, "hexamethoxymethylol" should be --hexamethoxymethyl--.

Column 4, in the figure, lead lines should be inserted connecting the inner hexagon to $R_1$ and $R_2$.

Column 8, line 46, "MH (lbs.)" should be --MH (in-lbs)--.

Column 8, line 47, "ML (lbs.)" should be --MH (in-lbs)--.

Column 9, line 21, "MH (lbs.)" should be --MH (in-lbs)--.

Column 9, line 22, "ML (lbs.)" should be --ML (in-lbs)--.

Column 9, line 34, --RH-- should be inserted after "95%)".

Column 10, line 29, --sulfonic-- should be inserted after "p-toluene".

UNITED STATES PATENT AND TRADEMARK OFFICE
CERTIFICATE OF CORRECTION

PATENT NO. : 5,021,522
DATED : June 4, 1991
INVENTOR(S) : BOJAYAN DURAIRAJ et al.

It is certified that error appears in the above-identified patent and that said Letters Patent is hereby corrected as shown below:

Column 11, line 41, a period --.-- should be inserted after "charged--.

Column 13, line 16, "40.0" should be --440.0--.

Column 16, line 4, "110" should be --100--.

Column 16, line 6, --50%-- should be inserted before "relative--.

Column 16, line 41, "38.60" should be --3.86--; "45.66" should be --4.57--; and "41.55" should be --4.16--.

Claim 5, column 17, in the figure, lead lines should be inserted connecting the inner hexagon to $R_1$ and $R_2$.

Claim 11, column 18, line 9, --about-- should be inserted before "14".

Signed and Sealed this

Twenty-sixth Day of July, 1994

Attest:

BRUCE LEHMAN

*Attesting Officer*        *Commissioner of Patents and Trademarks*